United States Patent
Mandel-Senft et al.

(10) Patent No.: US 12,090,879 B2
(45) Date of Patent: Sep. 17, 2024

(54) SYSTEM AND METHOD FOR VEHICLE FLEET CHARGING OPTIMIZATION

(71) Applicant: Rivian IP Holdings, LLC, Irvine, CA (US)

(72) Inventors: Adam J. Mandel-Senft, San Leandro, CA (US); John Michael Joseph Chaykowsky, Los Angeles, CA (US); Marinus Jacobus Adrianus Kerstens, Los Gatos, CA (US); William D. Vreeland, Palo Alto, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 6 days.

(21) Appl. No.: 17/532,735

(22) Filed: Nov. 22, 2021

(65) Prior Publication Data

US 2023/0158910 A1    May 25, 2023

(51) Int. Cl.
*B60L 53/36* (2019.01)
*B60L 53/67* (2019.01)
*B60W 60/00* (2020.01)
*G01C 21/34* (2006.01)

(52) U.S. Cl.
CPC ............. *B60L 53/36* (2019.02); *B60L 53/67* (2019.02); *B60W 60/001* (2020.02); *G01C 21/3415* (2013.01)

(58) Field of Classification Search
None
See application file for complete search history.

(56) References Cited

U.S. PATENT DOCUMENTS

| | | | |
|---|---|---|---|
| 11,598,641 B2 | 3/2023 | Jin et al. | |
| 2002/0185324 A1* | 12/2002 | Campbell | G08G 1/161 180/271 |
| 2011/0032110 A1* | 2/2011 | Taguchi | B60L 3/12 340/636.1 |
| 2016/0071417 A1* | 3/2016 | Lewis | G08G 1/162 701/301 |
| 2016/0341566 A1* | 11/2016 | Fund | G08G 1/012 |
| 2018/0118045 A1* | 5/2018 | Gruzen | B60L 53/665 |
| 2018/0189683 A1* | 7/2018 | Newman | B60L 58/12 |
| 2020/0207230 A1* | 7/2020 | Evans | B64F 1/362 |
| 2021/0122257 A1* | 4/2021 | Lee | B60L 53/62 |
| 2022/0089043 A1* | 3/2022 | Karri | B60L 3/0023 |

FOREIGN PATENT DOCUMENTS

| | | | | |
|---|---|---|---|---|
| CN | 104567907 A | * | 4/2015 | ......... G01C 21/3415 |
| CN | 109612495 A | * | 4/2019 | ......... G01C 21/3492 |
| JP | 2000209707 A | * | 7/2000 | .......... B60L 11/1838 |

OTHER PUBLICATIONS

Machine translation of JP-2000209707-A (Year: 2000).*
Machine translation of CN-109612495-A (Year: 2019).*
Machine translation of CN-104567907-A (Year: 2015).*

* cited by examiner

*Primary Examiner* — Anne Marie Antonucci
*Assistant Examiner* — Kyle S Park
(74) *Attorney, Agent, or Firm* — Haley Guiliano LLP

(57) ABSTRACT

Systems and methods for a computer-based process that optimizes vehicle fleet charging systems. Failed chargers are detected and optimal paths are determined between these failed chargers and available chargers. Upon determining the optimal path, instructions to route the vehicle from the failed chargers to available chargers via these shortest paths are then communicated.

19 Claims, 8 Drawing Sheets

SYSTEM AND METHOD FOR VEHICLE FLEET CHARGING OPTIMIZATION

INTRODUCTION

The present disclosure is directed generally to electric vehicle charging systems. More specifically, the present disclosure is directed to vehicle fleet charging optimization in electric vehicle charging systems.

SUMMARY

Electric vehicles have seen growing acceptance recently, as electric vehicles offer many significant advantages over conventional vehicles powered by internal combustion engines. For example, many argue that electric vehicles offer reduced reliance on fossil fuels, as well as simpler and more reliable vehicles with lower maintenance costs. Electric vehicles also pose significant challenges, however. As one example, organizations employing fleets of electric vehicles may utilize fleet charging depots to charge their vehicles. Such depots may be quite large, employing tens to hundreds of chargers depending on fleet size. Notably, if depot chargers experience nontrivial failure rates (e.g., as a result of high usage), the result is lost charging time and the need to move vehicles from failed chargers to functional ones.

Accordingly, systems and methods are described herein for an electric vehicle fleet management system that optimally redirects vehicles from charger failures by determining optimal or shortest routes between failed chargers and available, functional chargers, so that vehicles at failed chargers may be optimally moved to functional chargers to continue their charging. In some embodiments, a controller may utilize data analytics and machine learning algorithms to predict when a charger will fail (e.g., due to high use and the number of failures in past cases) and preemptively send instructions to move a vehicle to a functional charger, while concurrently flagging the failed charger for repair. Charging depots may be mapped and modeled as a graph network of nodes and edges representing possible vehicle paths between failed and functional chargers. Graph traversal methods may then be employed to determine the shortest such paths. Shortest paths may be implemented to more quickly route vehicles to available chargers, and reduce the impact of failed chargers on fleet charge time. For example, routing instructions may be issued to drivers, or instructions may be issued to autonomous electric vehicles to drive themselves along the specified shortest paths.

In some embodiments of the disclosure, shortest paths for differing vehicles are checked for intersecting paths, so as to prevent potential collisions between vehicles simultaneously driving to different chargers. In some embodiments, intersecting paths may be discarded, and next-shortest paths for such vehicles may instead be selected. While this may result in slightly longer drive times from failed to functional chargers, this reduction in efficiency may be offset by the increase in safety and vehicle availability provided by collision prevention.

In some embodiments of the disclosure, systems and methods are described herein for an electric vehicle fleet management system that further manages charging of an electric vehicle fleet according to the number of available chargers (taking into account failed chargers), the number of vehicles that must be charged, and their charge times. As one example, a fleet management system may generate a priority list of vehicles that must be moved to a functioning charger, to ensure that they are charged in time. Vehicles may then be moved out of chargers as they are sufficiently charged, with other vehicles moved into those now-available chargers in order of the priority list. In this manner, fleet management systems may ensure enough vehicles are sufficiently charged to complete any required tasks.

In some embodiments, these fleet management systems may also move vehicles out of chargers, and move other vehicles, via the above list, to now-available chargers along determined shortest paths, as above. That is, for each sufficiently-charged vehicle moved away from a charger, and each vehicle moved to that now-available charger such as via the above described priority list, systems of embodiments of the disclosure may determine shortest paths as above, and move these vehicles accordingly. Further, systems of embodiments of the disclosure may also determine potentially intersecting such shortest paths and eliminate them, thus avoiding collisions.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for a computer-based process that minimizes the impact of vehicle charger failures on fleet charging times. Failed chargers are detected, and shortest paths are determined between these failed chargers and available chargers. Vehicles are then routed from the failed chargers to available chargers via these shortest paths. Paths may also be determined so as to avoid collisions between vehicles when multiple vehicles must be moved at the same time.

Additionally, in some embodiments of the disclosure, vehicles are prioritized for charging according to any factors, such as their current charge level, desired or required charge level, and the like. When chargers fail, vehicles may then be moved from these failed chargers to available chargers in order of their priority, to better ensure an adequately charged fleet.

Figure 1:
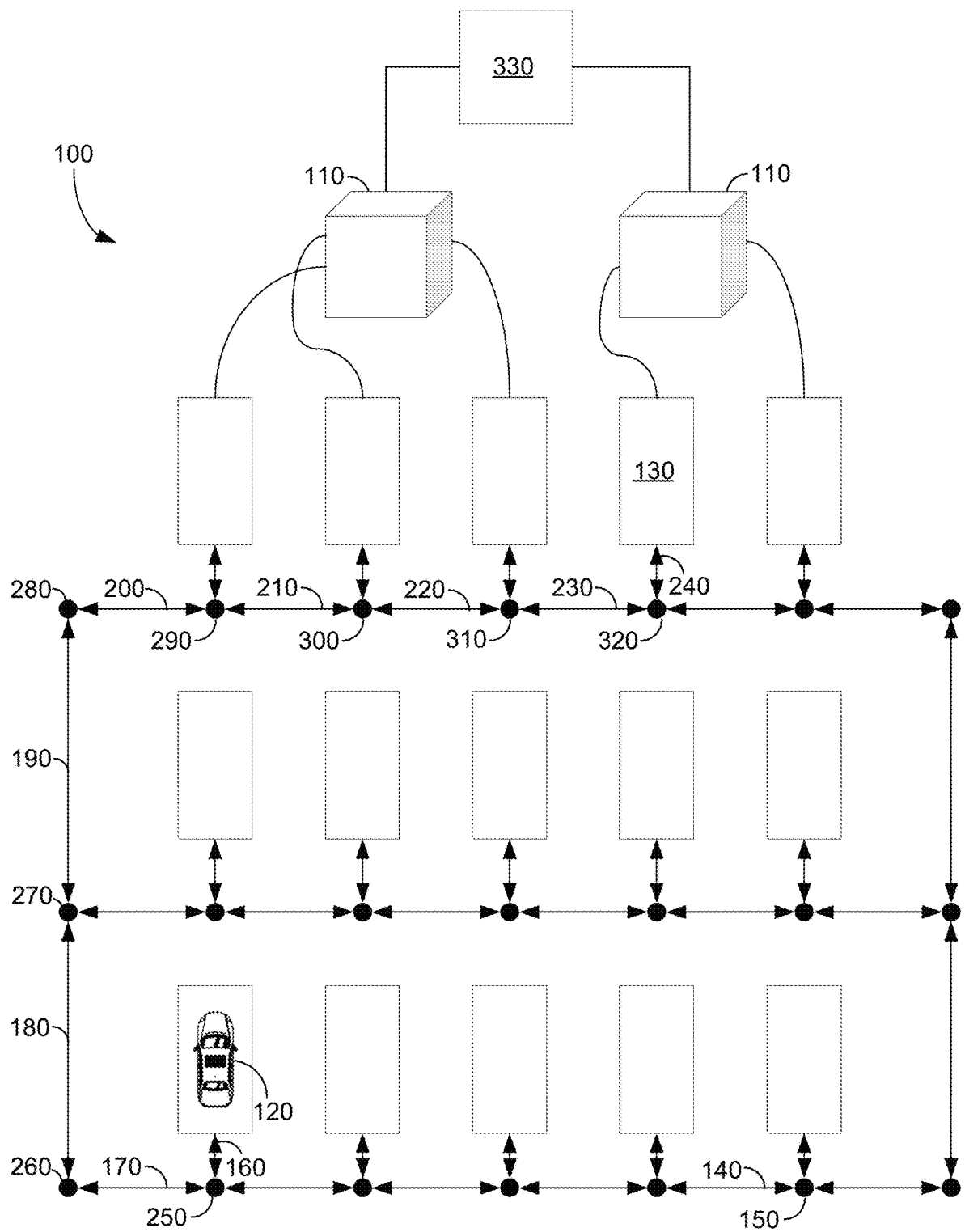
FIG. 1 is a conceptual top view of an exemplary vehicle charging system constructed in accordance with some embodiments of the disclosure.

FIG. 1 is a conceptual top view of an exemplary vehicle charging system constructed in accordance with some embodiments of the disclosure. Here, a vehicle charging system 100, which may be a fleet charging depot, includes at least one transformer 110 electrically coupled to a number of charging stations 130. Each charging station 130 includes a charging apparatus for electrically connecting to and charging an electric vehicle 120, as well as a physical space such as a stall or parking space for accommodating a vehicle 120 while it is connected to the charging apparatus. While the exemplary system 100 of FIG. 1 includes 15 charging stations 130 arranged in a 3×5 array, in embodiments of the disclosure, system 100 may include any number of transformers 110 in electrical communication with any number of charging stations 130 for charging any number of electric vehicles 120. Operations of the charging stations 130 may each be controlled by a controller 330 which may be in electronic communication therewith and which may include a processor such as any suitable digital computing device, further described below, which executes instructions for vehicle fleet charging optimization in accordance with methods and processes of any embodiments of the disclosure. While controller 330 is shown as having connections only to transformers 110, in some embodiments, controller 330 may couple to the charging stations 130, which includes data and other communication pathways.

In operation, vehicles 120 may be parked in any charging station 130, where they may remain while charging. Charging stations 130 may be arranged and spaced apart to provide paths therebetween, to allow for vehicles 120 to be moved from one charging station 130 to another, and/or to be moved into or out of system 100 such as when vehicles 120 enter the facility of system 100, or exit when sufficiently charged. Paths may be arranged in any manner between any one or more charging stations 130, and may be represented by path segments 140-240 that are connected at nodes 250-320. Here, nodes 250-320 may simply be representations of physical locations where two path segments 140-240 meet.

Accordingly, vehicle 120 may be moved to or from any charging station 130 along any pathways (represented in part by path segments 140-240). In particular, and as an example, the charger at the charging station 130 at which vehicle 120 is located in FIG. 1 may fail. Accordingly, vehicle 120 may be moved from that charging station 130 to another available charging station 130. In this example, the second rightmost charging station 130 in the top row of charging stations of FIG. 1 may be vacant or available, and the vehicle 120 may accordingly be moved there along the shortest path therebetween, e.g., along path segments 160, 170, 180, 190, 200, 210, 220, 230, 240 in that order (i.e., through nodes 250, 260, 270, 280, 290, 300, 310, 320 in that order). While it may be observed that vehicle 120 may be moved to the second rightmost charging station 130 of the top row of FIG. 1 along any other path, the path represented by path segments 160, 170, 180, 190, 200, 210, 220, 230, 240 in that order may be considered the shortest possible path for this arrangement of charging stations 130, and thus the most time-efficient and allowing for the greatest charge time at the destination station 130.

Figure 2:
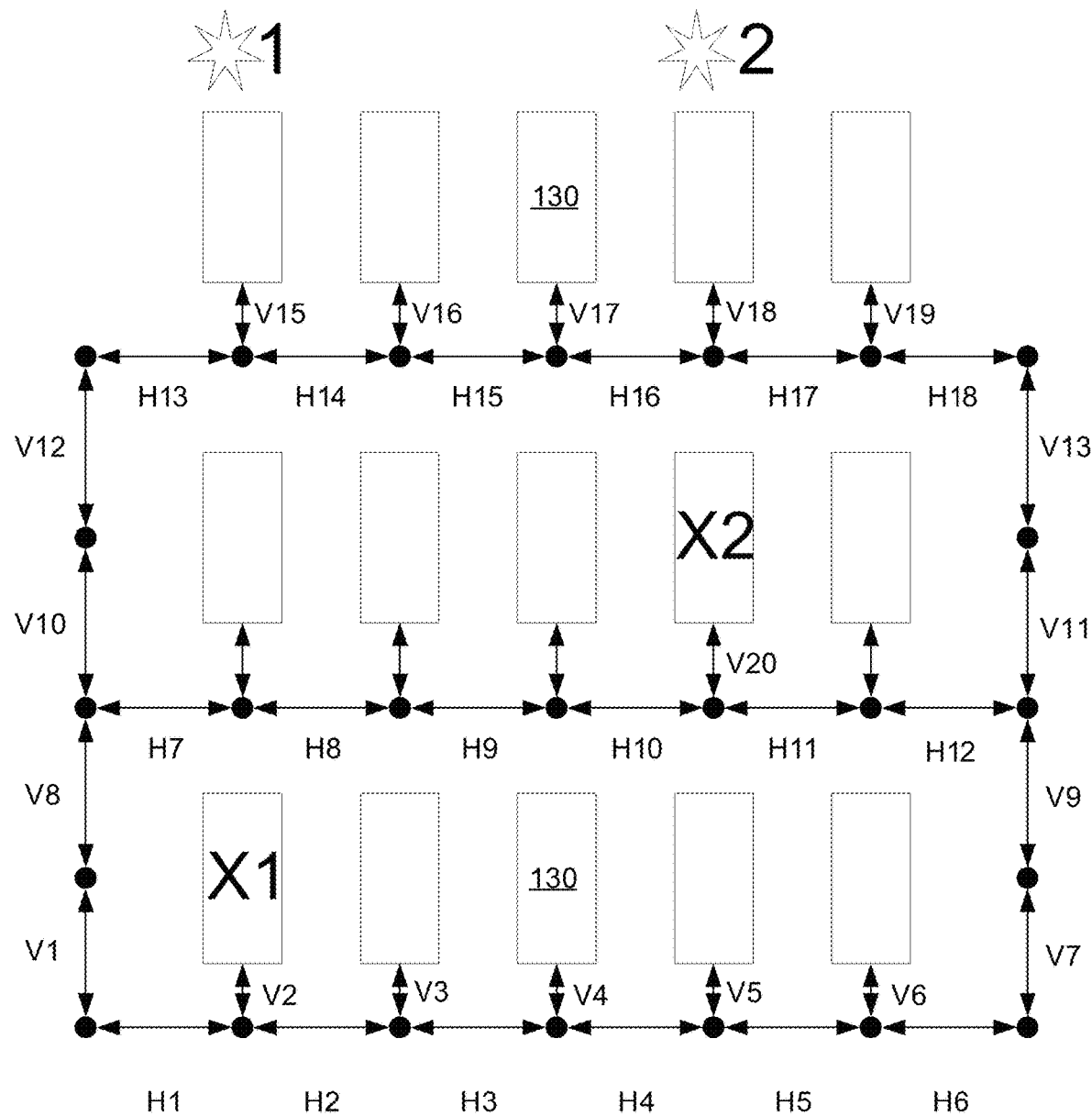
FIG. 2 is an abstraction of the exemplary vehicle charging system of FIG. 1, illustrating operation in accordance with some embodiments of the disclosure.

FIG. 2 is an abstraction of the exemplary vehicle charging system of FIG. 1, illustrating operation in accordance with some embodiments of the disclosure. In this example, each charging station 130 may be occupied by a vehicle 120 except for stations *1 and *2, i.e., the leftmost and second-rightmost charging stations 130 of the top row in the view of FIG. 2 are vacant and available for charging a vehicle.

Further, charging stations X1 and X2 may be considered to have failed, so that the vehicles located at stations X1 and X2 are to be moved to stations *1 and *2. Further, in this example, vehicles may travel between stations 130 along any set of path segments H1-H18, V1-V19, as shown.

In some embodiments of the disclosure, the shortest paths between failed stations X1, X2, and available stations *1, *2 may be determined, and vehicles may be sent to available stations *1, *2 along those shortest paths. Determination of such shortest paths may be determined in any manner. In some embodiments, multiple shortest paths may exist. It will be understood that if either the shortest path or the multiple shortest paths are not available, the next shortest path (e.g., n+1, where n equals the previous, unavailable path) will be identified. In some embodiments of the disclosure, shortest paths may be determined using an approach similar to a depth first search, with graph structures such as trees constructed representing all possible paths between each failed station X1, X2 and each available station *1, *2, and the branches of these trees traversed in spatial order until a shortest path that terminates at an available station *1, *2 is found.

Figure 3:
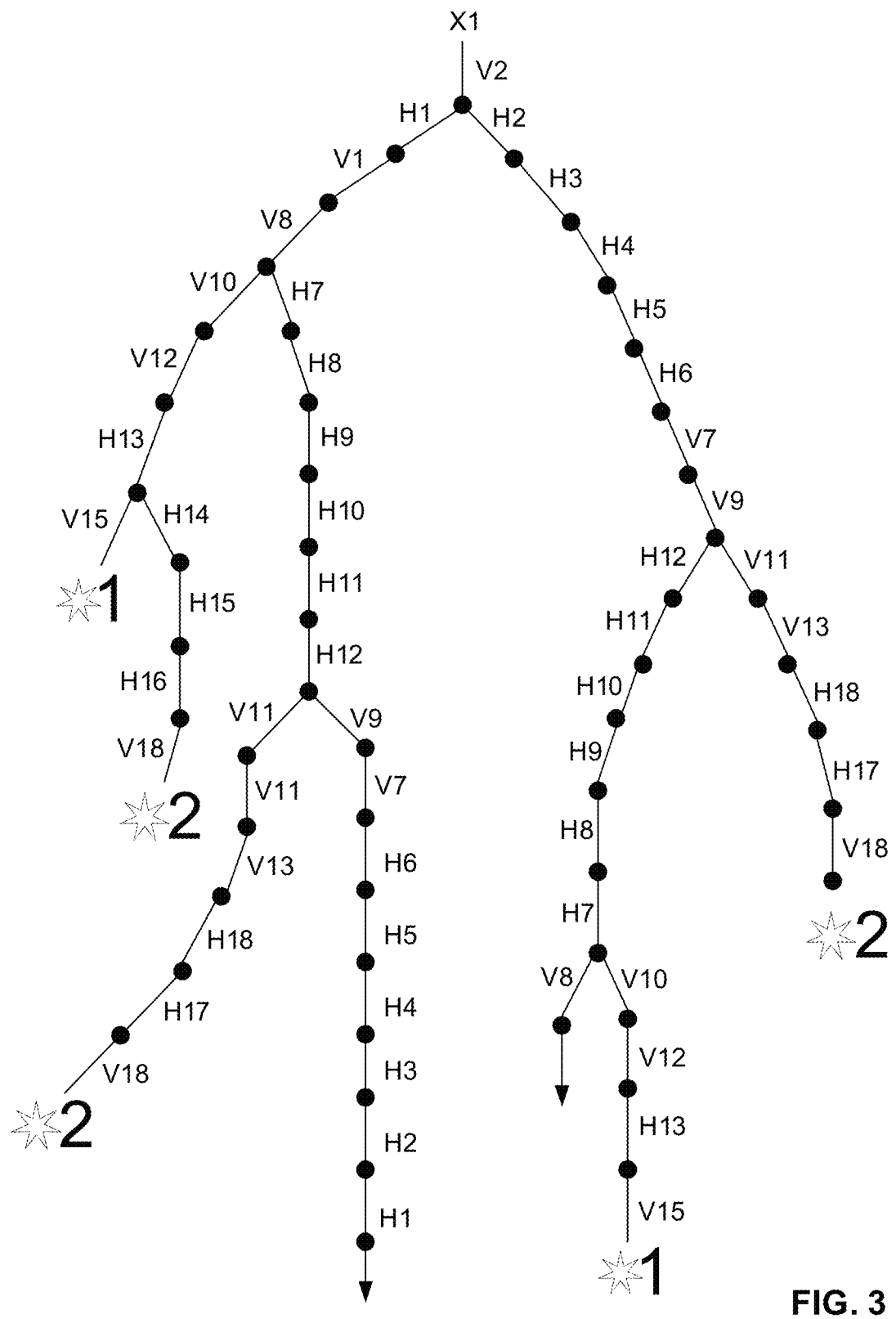
FIG. 3 and FIG. 4 are exemplary trees of vehicle paths drawn from the abstraction of FIG. 2 in accordance with some embodiments of the disclosure.
Figure 4:
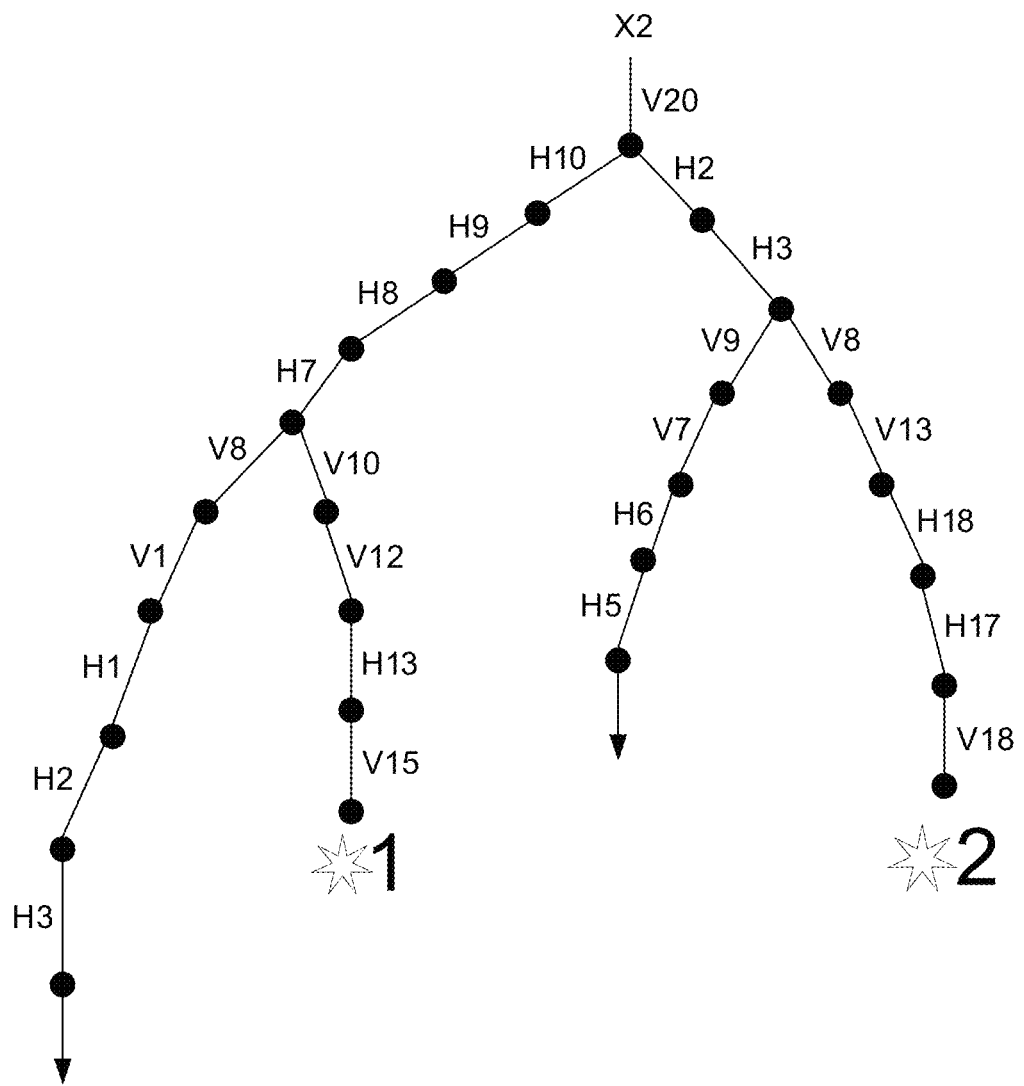

FIG. 3 and FIG. 4 are exemplary trees of vehicle paths drawn from the abstraction of FIG. 2, illustrating shortest path determination in accordance with some embodiments of the disclosure. As above, tree representations of each path between each failed station X1, X2 and each available station *1, *2 may be drawn, with each branch of the tree representing a different unique path. FIG. 3 illustrates a tree of paths between failed station X1 and available stations *1 and *2. The tree representation of FIG. 3 may be drawn by traversing each possible path from failed station X1 and plotting its path segments in order. For example, beginning at station X1, paths may extend left and right (in the view of FIG. 2), i.e., paths may begin with traversal of path segment V2, then either path segment H1 or H2. The leftmost branch thus extends along the leftmost outer edge of the path layout of FIG. 2 to station *1, tracing path H1-V1-V8-V10-V12-H13-V15. Another path may diverge after segment H13 toward station *2, tracing branch H14-H15-H16-V18. The next branch may diverge after segment V8, extending along the middle row of FIG. 2 and upwards to station *2, tracing path H7-H8-H9-H10-H11-H12-V11-V13-H18-H17-V18. The next branch may diverge after segment H12, extending down and along the lower row of FIG. 2, tracing path V9-V7-H6-H5-H4-H3-H2-H1 . . . . It may be observed that this path continues on along the leftmost edge of FIG. 2 to both stations *1 and *2, although is longer than previously-described paths.

In some embodiments of the disclosure, such paths may simply be traced and added to the tree in their entirety, even though it may already be observed that they are longer than other paths. However, in some embodiments of the disclosure, such paths may be terminated or removed from the tree based on any criteria indicating that they do not trace a shortest path. For example, paths that exceed some predetermined length or number of path segments may be pruned or removed from the tree. This predetermined length may, for instance, be a length greater than an already-determined branch or path, a pre-set path length threshold, or any other value indicating an excessively long and thus unsuitable path. Alternatively, paths that have a significant portion (e.g., greater than a predetermined number of path segments) proceeding in a direction spatially away from either destination station *1 or *2 may be discarded or removed from the tree.

The rightmost paths taken from segment V2 may be determined in similar manner, with a path extending rightward from segment V2 and upward along the rightmost edge of the path layout of FIG. 2, to station *2, tracing path H2-H3-H4-H5-H6-V7-V9-V11-V13-H18-H17-V18. Another path diverges after segment V9 and extends along the middle row of FIG. 2 then upward to station *1, tracing path H12-H11-H10-H9-H8-H7-V10-V12-H13-V15. A further path diverges from this after segment H7, extending downward and tracing path V8-V1-H1-H2, etc. As above, it may be observed that this last path continues on to form a path that is longer than previously-described paths. This path may thus be traced and added to the tree in its entirety even though it may already be observed that it is longer than other paths. Alternatively, this path may be pruned or removed from the tree based on any criteria, such as its excessive length.

Once formed, each branch of the tree of FIG. 3 may be traversed in order, e.g., from left to right, to determine the shortest path or branch that leads to either station *1 or *2. For example, a system may analyze the tree structure of FIG. 3 by traversing the leftmost path or branch of the tree first, describing a path having a length of 8 segments and terminating at station *1. The system may subsequently traverse the next-to-leftmost path or branch, which diverges from the leftmost path after segment H13. This path may be determined to have a length of 11 segments and terminate at station *2. The system may then traverse the next path to the right in FIG. 3, determining it to have a length of 16 segments terminating at station *2. The system may then traverse the next path to the right (branching from the previous path after segment H12), calculating its length or determining its length to be excessive as above. The remaining paths, in left to right order, may similarly be found to have 1) an excessive length, 2) a length of 18 segments terminating at station *1, and 3) a length of 13 segments terminating at station *2. Accordingly, the shortest path found is the leftmost path, having a length of 8 segments and extending from station X1 to station *1. That is, the shortest path from station X1 to either station *1 or *2 extends along the leftmost edge of the graph of FIG. 2, to terminate at station *1.

FIG. 4 illustrates a tree of paths between failed station X2 and available stations *1, *2. As in FIG. 3, the tree structure of FIG. 4 may be constructed by plotting the possible paths between station X2 and each available station *1, *2. For example, a first path may proceed from station X2 leftward along the middle horizontal path of FIG. 2, and downward after segment H7, tracing path V20-H10-H9-H8-H7-V8-V1-H1-H2-H3, etc. As above, it may be observed that this path continues on to form a path that may be considered excessively long. This path may thus be traced and added to the tree in its entirety even though it may be observed that it is longer than other paths. Alternatively, this path may be pruned or removed from the tree (or not added) based on any criteria, such as its excessive length. The next path may be the path proceeding upward after segment H7 to station *1, tracing path V10-V12-H13-V15. The remaining paths extend rightward from station X2 instead of leftward, and may be determined and plotted similar to the previous paths. This includes path H2-H3-V9-V7-H6-H5, etc., and path H2-H3-V8-V13-H18-H17-V18 which terminates at station *2. Accordingly, the shortest path found is the rightmost path in FIG. 4, which has a length of 8 segments and terminates at station *2.

In this manner, it may be observed that, for this exemplary arrangement of charging stations, the shortest route for a vehicle located at station X1 is path V2-H1-V1-V8-V10-V12-H13-V15 to available station *1, and the shortest route for a vehicle located at station X2 is path V20-H2-H3-V8-V13-H18-H17-V18 to available station *2. Embodiments of the disclosure thus contemplate determination of shortest paths between failed and available charging stations by, for each failed station, establishing a tree or graph describing all possible paths between that station and the available stations. Branches of this tree may then be traversed in spatial order, e.g., from left to right, to determine the shortest branch or path.

It is noted that a depth first search-type approach is carried out in the above examples. That is, branches of each tree are traversed in spatial order from one side to the other. However, any alternative order may be carried out, i.e., branches may be traversed in any order, so long as the shortest branch can be determined.

In some embodiments of the disclosure, determined shortest paths may further be analyzed for collision risk. Such analysis may be performed in any manner. As one example, determined shortest paths may be checked for common path segments, indicating an intersection between the two paths and thus a potential collision if vehicles traverse the two paths simultaneously. Alternatively, path lengths and vehicle speeds may be taken into account, to determine whether vehicles on paths with intersecting segments may reach those segments at approximately the same time, thus indicating the likelihood of a collision. Embodiments of the disclosure contemplate any method or approach for determining the likelihood of a collision for determined shortest paths. In some embodiments, a time delay may be implemented in the case where no pair of paths exist that are not intersecting to generate a collision-free path.

Figure 5:
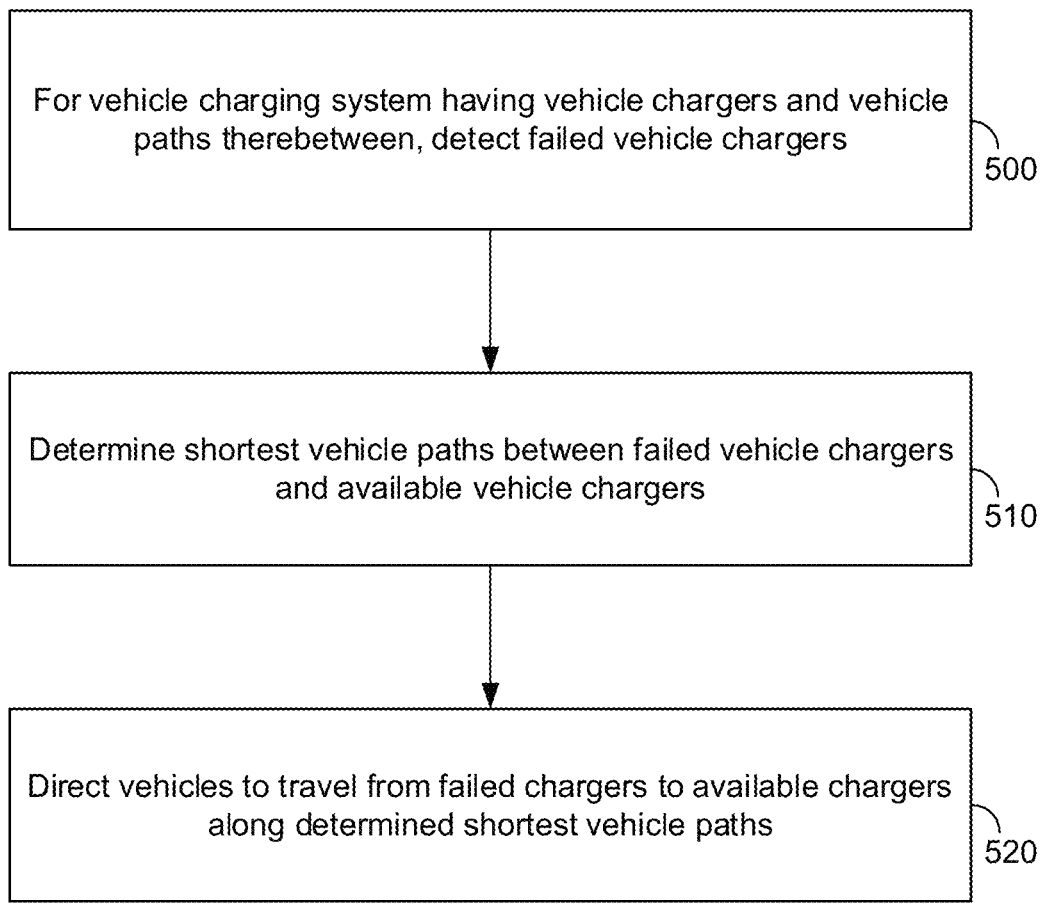
FIG. 5 is a flowchart illustrating an exemplary process for optimally redirecting vehicles from vehicle charger failures in accordance with some embodiments of the disclosure.

FIG. 5 is a flowchart illustrating an exemplary process for optimally redirecting vehicles from vehicle charger failures in accordance with some embodiments of the disclosure. In particular, FIG. 5 summarizes and further explains aspects of the process described above in connection with FIGS. 1-4. Here, a vehicle charging system such as system 100 may have a number of vehicle chargers and vehicle paths therebetween, to allow vehicles to travel from one charger to another. One or more portions of the system, such as controller 330, may then detect failed vehicle chargers (Step 500). Controller 330 may then determine the shortest vehicle paths between these failed chargers and any available vehicle chargers (Step 510). In particular, controller 330 may keep track of which chargers are currently occupied, e.g., currently charging a vehicle, and which are not. Available chargers may be those which have no vehicle in their stall, or which have a sufficiently charged vehicle in their stall. In the latter case, in some embodiments of the disclosure, controller 330 may instruct these vehicles to vacate the stall, e.g., move out of the charging depot. In some embodiments, the controller may utilize data analytics and machine learning algorithms to predict when a charging station may fail due to overuse. For example, based on historical failure data, the controller may identify that a charging station may be close to an overuse threshold and determine that the charging station may fail within a near time frame. Upon making this determination, the controller may perform the steps below to move a current vehicle from the identified charging stations to an available charging station and send instructions for the identified charging station to be repaired or serviced.

As above, controller 330 may determine shortest paths between detected failed chargers and any available chargers, by constructing a layout of charger positions and paths therebetween, chargers such as that shown in FIG. 2. Shortest paths between the specific failed and available chargers may then be determined as above, by constructing a tree of possible paths between these specific chargers, and traversing each branch of the trees in order to determine their length, with shortest branches representing shortest paths. In some embodiments, the shortest paths are predetermined and stored in memory and controller 330 retrieves the shortest paths from memory. Controller 330 may then direct vehicles to travel from detected failed chargers to the available chargers along the determined shortest vehicle paths (Step 520). In some embodiments of the disclosure, the vehicles in question may be autonomous vehicles, and controller 330 may instruct the vehicles of the route they should navigate to follow the determined shortest paths. Alternatively, the vehicles in question may be vehicles that are not capable of autonomous navigation, and controller 330 may instruct drivers of the vehicles via a user interface of a display device (e.g., driver's mobile device or vehicle driver display), audio directions, or other navigation means, as to the routes they should take when driving their vehicles from failed chargers to available ones.

Figure 6:
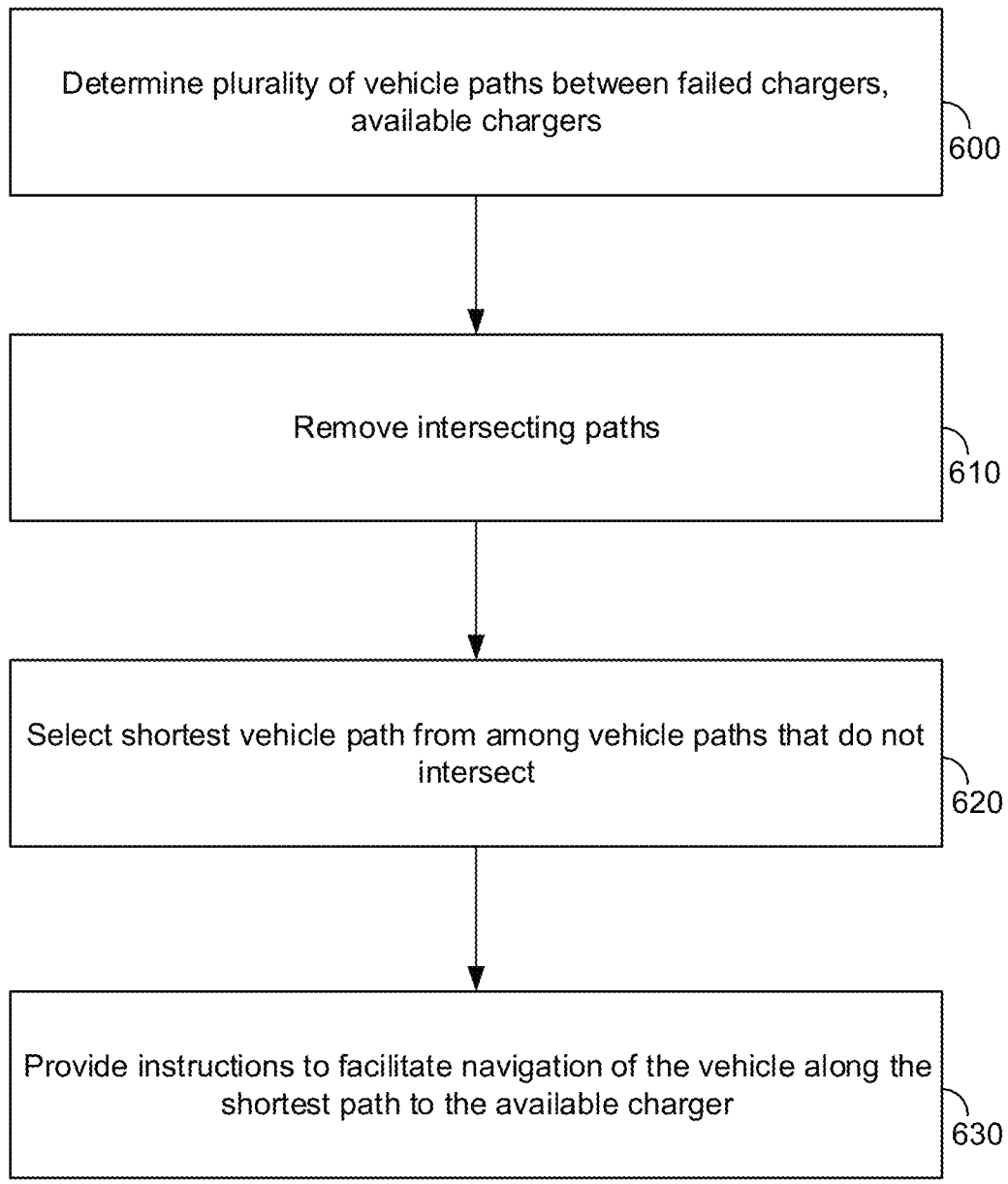
FIG. 6 is a flowchart illustrating an exemplary process for collision avoidance in vehicle charger failures, in accordance with some embodiments of the disclosure.

FIG. 6 is a flowchart illustrating an exemplary process for collision avoidance in vehicle charger failures, in accordance with some embodiments of the disclosure. As above, once controller 330 determines shortest paths between failed and available chargers, it may in some embodiments also determine whether any pairs of these determined paths intersect each other, so as to prevent or reduce the risk of collision. Here, controller 330 may first determine a number of vehicle paths between failed and available chargers (Step 600), as above. Controller 330 may then check whether any of these paths presents potential collision risks. As above, determined shortest paths may be checked for common path segments, indicating an intersection between the two paths and thus a potential collision if vehicles traverse the two paths simultaneously. Alternatively, path lengths and vehicle speeds may be taken into account, to determine whether vehicles on paths with intersecting segments may reach those segments at approximately the same time, thus indicating the likelihood of a collision. Embodiments of the disclosure contemplate any method or approach for determining the likelihood of a collision for determined shortest paths. Accordingly, paths deemed to intersect each other or to otherwise present a collision risk are removed as shortest path candidates (Step 610). Once intersecting paths are removed, the shortest remaining paths are selected. That is, controller 330 selects the shortest paths from among those determined vehicle paths that do not intersect or otherwise present a collision risk (Step 620). Controller 330 may facilitate the navigation of a vehicle to an available charger, via the shortest, unobstructed path, by sending instructions and an internal map to a driver's mobile device (Step 630). In some embodiments, the vehicle may be autonomous, in which case the controller 330 may cause the autonomous vehicle to move to the available charger by providing instructions to the vehicle to display the shortest path on an embedded navigation system and user interface. In some embodiments, controller 330 may select an optimal path for the vehicle to take to an available charger, which may include the shortest path, the shortest unobstructed path, the fastest path, or the fastest unobstructed path. In this manner, vehicles are more efficiently routed to available chargers while avoiding risk of collision.

Figure 7:
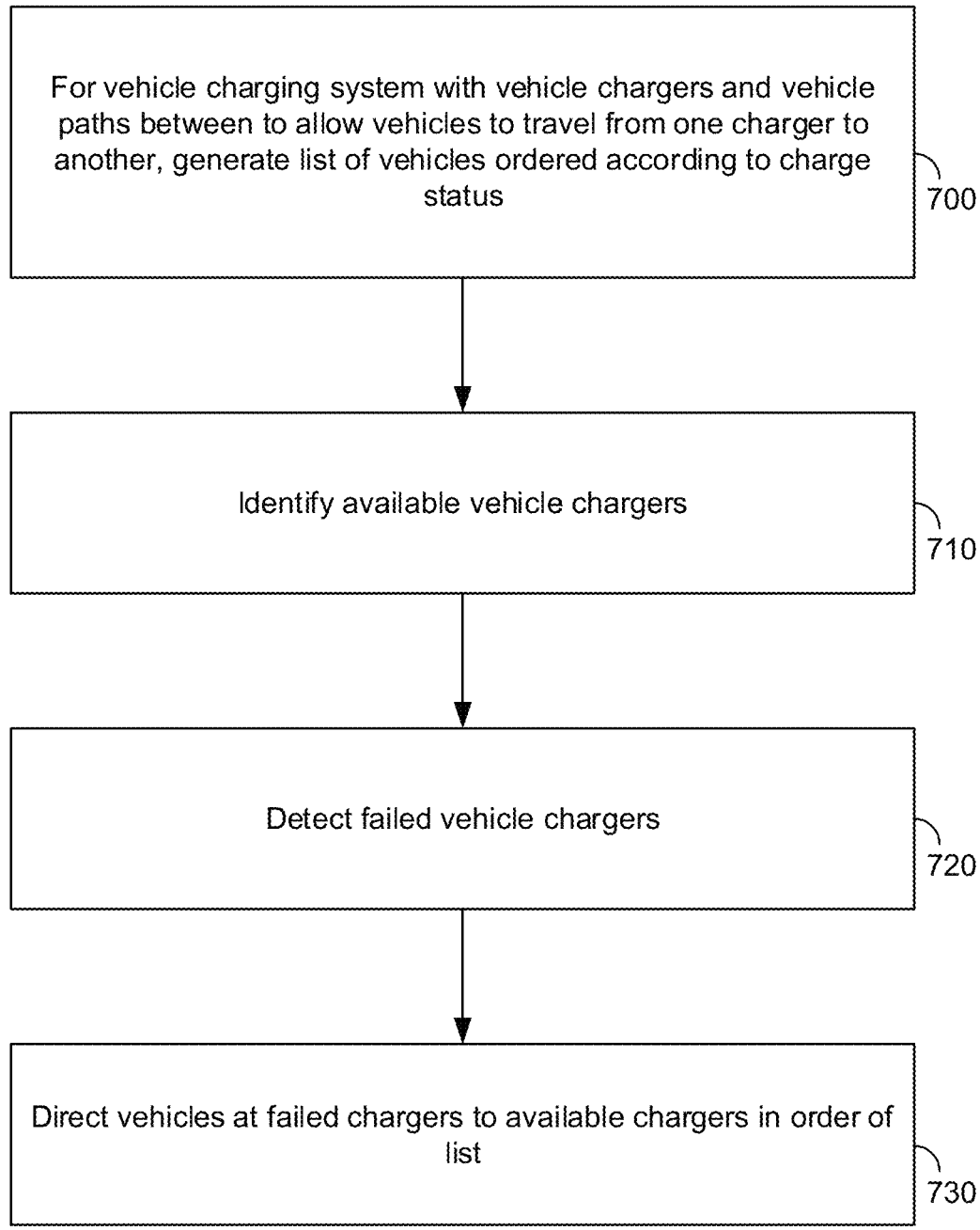
FIG. 7 is a flowchart illustrating an exemplary process for managing charging of multiple vehicles, in accordance with some embodiments of the disclosure.

In some embodiments of the disclosure, systems and methods are described herein for an electric vehicle fleet management system that further manages charging of an electric vehicle fleet according to the number of available chargers (taking into account failed chargers), the number of vehicles that must be charged, and their charge times. FIG. 7 is a flowchart illustrating an exemplary process for managing charging of multiple vehicles, in accordance with some embodiments of the disclosure. As with FIG. 5, a vehicle charging system such as system 100 may have a number of vehicle chargers and vehicle paths therebetween, to allow vehicles to travel from one charger to another. Controller 330 may then generate a list of vehicles, ordered according to charge status (Step 700). More specifically, controller 330 may order the vehicles 120 of a system 100 such as a charging depot, according to the priority at which they should be charged, and then move vehicles to available chargers according to their priority. In particular, controller 330 may receive information including the amount of charge needed by each vehicle in a depot, e.g., the amount of charge needed for the next day's tasks. Controller 330 may then determine the degree to which each vehicle is presently charged, and in turn determine the remaining charge time for each vehicle according to the difference between the amount of charge needed, the amount of charge existing presently, and the charge rate of the chargers of system 100. In this manner, controller 330 thus determines the remaining charge time for each vehicle 120, and may generate a list of these vehicles 120, ordered by their remaining charge time, e.g., vehicles 120 with greatest remaining charge times are listed highest.

System 100 may thus charge vehicles 120, e.g., to ensure fleet readiness by some predetermined deadline such as the beginning of the next work day. Controller 330 may then identify available vehicle chargers (Step 710). Those vehicles 120 which are sufficiently charged may be moved out of the system 100, rendering their charging station available. Controller 330 may also detect failed vehicle chargers (Step 720) in known manner, and direct those vehicles at identified failed chargers to available chargers in list order (Step 730), so that highest-priority vehicles 120 are routed to new chargers first. Vehicles 120 are routed to available chargers according to shortest paths as above, further minimizing down-time due to charger failures, and minimizing any reduction in charge times due to charger failures.

Figure 8:
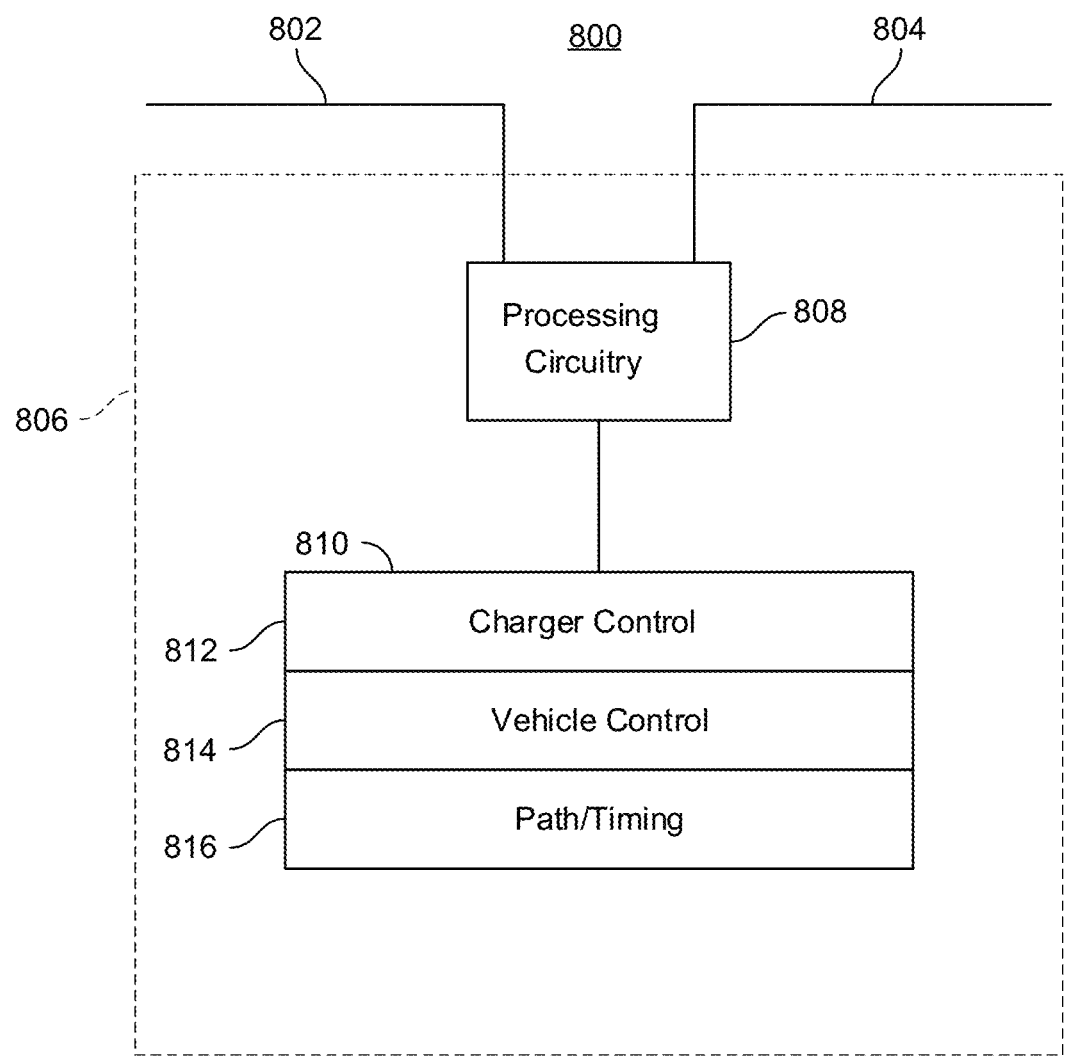
FIG. 8 is a block diagram of an illustrative device for executing optimal vehicle path redirection in wake of vehicle charger failures, in accordance with some embodiments of the disclosure.

FIG. 8 is a block diagram of an illustrative device for executing optimal vehicle path redirection in wake of vehicle charger failures, in accordance with some embodiments of the disclosure. FIG. 8 is a generalized embodiment of an illustrative controller 330 constructed for use according to embodiments of the disclosure. Here, device 800 may serve as a controller 330 of system 100. Device 800 may receive data via I/O paths 802 and 804. I/O path 802 may receive data from and transmit instructions to charging stations 130 and transformers 110, while I/O path 804 may exchange data and commands with remote devices such as remote servers and/or storage. Device 800 has control circuitry 806, which includes processing circuitry 808 and storage 810. In some embodiments of the disclosure, I/O path 802 allows controller 330 to communicate with vehicles 120, either through charging stations 130 or directly with the vehicles 120 themselves such as via a wireless communications link. Accordingly, in some embodiments of the disclosure, I/O path 802 allows controller 330 to instruct vehicles 120, including instructions to navigate from failed to available chargers, to enter/exit the system 100, and the like.

Control circuitry 806 may be based on any suitable processing circuitry such as processing circuitry 808. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 806 executes instructions for performing the vehicle fleet charging optimization processes described herein.

Memory may be an electronic storage device provided as storage 810, which is part of control circuitry 806. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 810 may be used to store various instructions for carrying out any of the methods and processes described herein. Nonvolatile memory may also be used (e.g., to launch a boot-up routine and other instructions). Cloud-based storage may be used to supplement storage 810 or instead of storage 810.

Storage 810 is a memory that stores a number of programs for execution by processing circuitry 808. In particular, storage 810 may store a charger control module 812 for controlling operation of each vehicle charger and detecting failed chargers, a vehicle control module 814 for directing vehicles or drivers to traverse determined shortest paths, and path/timing module 816 for determining shortest paths and detecting paths posing potential collision risks. Each of the modules 812, 814, 816 contains instructions for carrying out the above described functions when executed by the processing circuitry 808.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, paths may be determined for any electric vehicles, autonomous or otherwise. Paths presenting collision risk may be removed or may be included if desired. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of managing vehicle charging for a vehicle, the method comprising:
   detecting a failed one of a plurality of vehicle chargers;
   using processing circuitry, determining an optimal vehicle path between the failed one of the vehicle chargers and an available one of the vehicle chargers from a plurality of vehicle paths extending between the failed one of the vehicle chargers and at least two available vehicle chargers by:
     determining, for a first vehicle, a shortest one of the vehicle paths, wherein the first vehicle is an autonomous vehicle;
     comparing the shortest one of the vehicle paths with a second path of a second vehicle to determine whether the first vehicle and the second vehicle will simultaneously traverse a common path segment of the shortest one of the vehicle paths and the second path; and
     removing or modifying the shortest one of the vehicle paths or the second path such that the first vehicle and the second vehicle will not simultaneously traverse the common path segment; and
   using the processing circuitry, causing the first vehicle to travel from the failed one of the vehicle chargers to the available one of the vehicle chargers along the determined optimal vehicle path.

2. The method of claim 1, wherein:
   the detecting further comprises detecting failed ones of the vehicle chargers, and the determining comprises determining optimal ones of the vehicle paths, each of the optimal ones corresponding to a respective one of the failed ones of the vehicle chargers and being a path between one of the failed vehicle chargers and a differing one of the available vehicle chargers.

3. The method of claim 2, wherein none of the determined optimal ones of the vehicle paths intersect each other.

4. The method of claim 1, wherein the determining the optimal vehicle path comprises:
   determining the plurality of the vehicle paths extending between the failed one of the vehicle chargers and the at least two available chargers, wherein the shortest one of the vehicle paths is one of the plurality of the vehicle paths.

5. The method of claim 4, wherein the determining the plurality of the vehicle paths further comprises determining which vehicle paths of the determined plurality of the vehicle paths do not intersect at least one other of the vehicle paths that extends between other ones of the vehicle chargers, and wherein the shortest one of the plurality of the vehicle paths is one of the determined plurality of the vehicle paths that do not intersect any of the vehicle paths that extends between the other ones of the vehicle chargers.

6. The method of claim 1, wherein the causing the first vehicle to travel from the failed one of the vehicle chargers to the available one of the vehicle chargers along the determined optimal vehicle path comprises transmitting electronic data containing an instruction to the autonomous vehicle to navigate from the failed one of the vehicle chargers to the available one of the vehicle chargers along the determined optimal vehicle path.

7. The method of claim 1, wherein removing or modifying the shortest one of the vehicle paths or the second path includes implementing a time delay in the shortest one of the vehicle paths or the second path.

8. The method of claim 1, wherein removing or modifying the shortest one of the vehicle paths or the second path includes removing the shortest one of the vehicle paths as a candidate for the determined optimal vehicle path.

9. The method of claim 8, further comprising selecting a shortest remaining path as the determined optimal vehicle path.

10. The method of claim 1, further comprising:
using the processing circuitry, controlling a display of the first vehicle to display the determined optimal vehicle path.

11. A method of managing vehicle charging, the method comprising:
generating a list of vehicles ordered according to a charge status of each of the vehicles;
identifying available ones of a plurality of vehicle chargers;
detecting failed ones of the plurality of vehicle chargers; and
using processing circuitry, causing, in order of the generated list, ones of the vehicles at the failed ones of the vehicle chargers to move from the failed ones of the vehicle chargers to the available ones of the vehicle chargers via respective optimal paths, wherein each of the ones of the vehicles is an autonomous vehicle, and wherein at least one optimal path determined from a plurality of vehicle paths extending between a failed one of the vehicle chargers and at least two available vehicle chargers, each optimal path determined by:
determining, for a first vehicle of the ones of the vehicles, a shortest one of the vehicle paths;
comparing the shortest one of the vehicle paths with a second path of a second vehicle to determine whether the first vehicle and the second vehicle will simultaneously traverse a common path segment of the shortest one of the vehicle paths and the second path; and
removing or modifying the shortest one of the vehicle paths or the second path such that the first vehicle and the second vehicle will not simultaneously traverse the common path segment.

12. The method of claim 11, wherein the vehicles of the list are further ordered according to a target charge amount.

13. The method of claim 11, further comprising directing charged ones of the vehicles to travel away from the respective vehicle chargers, so as to create the available ones of the vehicle chargers.

14. The method of claim 11, wherein the vehicles are autonomous vehicles.

15. The method of claim 14, wherein the causing the ones of the vehicles at the failed ones of the vehicle chargers to move from the failed ones of the vehicle chargers to the available ones of the vehicle chargers via respective optimal paths comprises transmitting electronic data containing instructions to the ones of the vehicles, in order of the generated list, to navigate from the failed ones of the vehicle chargers to the available ones of the vehicle chargers.

16. A system for managing vehicle charging, the system comprising:
a storage device; and
control circuitry communicatively linked with the storage device, the control circuitry configured to:
detect failed ones of a plurality of vehicle chargers;
determine optimal vehicle paths between the failed ones of the vehicle chargers and available ones of the vehicle chargers, at least one optimal vehicle path determined from a plurality of vehicle paths extending between a respective failed one of the vehicle chargers and at least two available vehicle chargers by:
determining, for a first vehicle, a shortest one of the vehicle paths between the respective failed one of the vehicle chargers and the at least two available vehicle chargers;
comparing the shortest one of the vehicle paths with a second path of a second vehicle to determine whether the first vehicle and the second vehicle will simultaneously traverse a common path segment of the shortest one of the vehicle paths and the second path; and
removing or modifying the shortest one of the vehicle paths or the second path such that the first vehicle and the second vehicle will not simultaneously traverse the common path segment; and
cause each of the first vehicle and the second vehicle to travel from the failed ones of the vehicle chargers to the available ones of the vehicle chargers along the determined optimal vehicle paths, wherein each of the first vehicle and the second vehicle is an autonomous vehicle.

17. The system of claim 16, wherein the control circuitry is configured to determine optimal vehicle paths by determining, for each failed one of the vehicle chargers, an optimal vehicle path between the failed one of the vehicle chargers and an available one of the vehicle chargers, each determined optimal vehicle path being a path between one of the failed vehicle chargers and a differing one of the available vehicle chargers.

18. The system of claim 17, wherein none of the determined optimal vehicle paths intersect each other.

19. The system of claim 16, wherein the control circuitry is further configured to generate a list of the first vehicle and the second vehicle ordered according to a charge status, wherein the first vehicle and the second vehicle of the list are further ordered according to a target charge amount.

* * * * *